United States Patent [19]
Anderson

[11] 4,386,812
[45] Jun. 7, 1983

[54] BEARING LOCK FOR A DYNAMOELECTRIC MACHINE

[75] Inventor: Wesley K. Anderson, Schofield, Wis.

[73] Assignee: Marathon Electric Manufacturing Corp., Wausau, Wis.

[21] Appl. No.: 280,799

[22] Filed: Jul. 6, 1981

[51] Int. Cl.³ .................. F16C 35/077; F16C 33/30
[52] U.S. Cl. .......................... 308/236; 308/189 R
[58] Field of Search ............. 308/189 R, 236, 193, 308/22, 15; 411/907, 908, 401, 184, 187

[56] References Cited

U.S. PATENT DOCUMENTS

| | | | |
|---|---|---|---|
| 2,388,658 | 11/1945 | Pumphrey | 411/401 |
| 2,837,382 | 6/1958 | Schaefer | 308/236 |
| 2,890,845 | 6/1959 | Kickhaefer | 411/908 |
| 2,891,829 | 6/1959 | Irvin | 308/236 |
| 3,469,897 | 9/1969 | Rike | 308/236 |
| 3,930,965 | 1/1976 | Forrest | 308/236 |
| 4,289,360 | 9/1981 | Zirin | 308/236 |

*Primary Examiner*—Stuart S. Levy
*Assistant Examiner*—David Werner
*Attorney, Agent, or Firm*—Andrus, Sceales, Starke & Sawall

[57] ABSTRACT

A bearing locking construction for dynamoelectric machines having a bearing locking assembly which can be located in place after an electric motor or other dynamoelectric machine is completely assembled. The construction includes a bearing housing which has at least a pair of abutments located on opposite sides of the motor shaft which house a fastening means for locating the bearing lock and securing the bearing in its seat and consists of fasteners which are assembled through the abutments from the outboard side of the motor and has a large T-shaped head rotated by rotation of the fastener to overlap the bearing on one side and an axially spaced seat on the opposite side. Stops or tabs located on both sides of the head prevent the fastener from rotating once it is in place and the fastener is secured in place with a preload thereon by several different constructions which draw the fastener outwardly to force the inner end of the head against the outer bearing race and the outer end of the head against the spaced seat. The fastener may be internally threaded and receive a screw with a head assembled over a washer to secure the screw head and washer to the outboard side of the abutment when threaded into the fastener. The fastener may include a threaded shaft to receive a nut which abuts against the outboard side of the abutment.

11 Claims, 6 Drawing Figures

BEARING LOCK FOR A DYNAMOELECTRIC MACHINE

BACKGROUND OF THE INVENTION

In previous constructions of a bearing lock assembly with dynamoelectric machines, the bearing lock is often assembled before the machine was completely assembled. The prior art has suggested a locking device applied after the motor is assembled. For example, U.S. Pat. No. 3,930,695 discloses a locking means operable from the outside of the motor enclosure. With the construction of the present invention, an electric motor, for example, may be completely assembled and thereafter the bearing lock accurately assembled in place in a bearing and bracket provided for that purpose to reliably and firmly lock the bearings in place. The means of locating the lock relative to the bearing and the means in which the bearing lock preload is applied and supported distinguishes the invention from the prior art.

SUMMARY OF THE INVENTION

The invention is directed to a bearing locking assembly for a dynamoelectric machine such as an electric motor. The construction has a bearing bracket at an end of a motor which is secured to the frame of the motor and has a bearing seat which receives a shaft bearing. In an optimum structure, the shaft bearing has an outer race projecting slightly inwardly of the bracket. The bracket has housings or abutments which are located on opposite sides of the motor shaft, and each housing ordinarily has the same bearing fastening construction. Each housing has a generally central opening closed by inboard and outboard walls each of which has a non-circular slotted opening normally in alignment with each other and extending across the bearing. The inward wall has offset stops on each side of the slotted opening therein. A bearing fastening means is inserted through the opening in the outboard wall of the bracket and in a first embodiment consists of a fastener having threads on the inside and a generally large head which when rotated in place in the inboard slotted opening locates it between and abutting the stops to limit the rotation and overlaps the bearing and radially outer wall of the abutment. The fastener is drawn outwardly to abut the bearing and lock the bearing in its seat. The outward movement of the fastener is selected to deflect the head, such that the side opposite the bearing engages the spaced outer wall of the abutment. The fastening member thus extends through the slotted opening in the inboard wall and to the outboard wall and a screw is threaded into the fastener in the first embodiment. Under the head of the screw is a washer and when the screw is threaded home in the fastener the head of the screw holds the washer in engagement with the outboard wall and locks the fastener to the bearing and also aligns the screw to the T-head so that the locking forces are axial on the outer race of the bearing, and the deflected head engaging the outer wall limits the stress in the head and functions as an effective "lock" washer on the assembly.

Under a second embodiment of the invention, the fastener is threaded on the outer end and receives a washer and nut which when threaded thereon and against the outboard wall of the housing again secures the generally large T-shaped head on the fastening member against the bearing outer wall of the abutment and the fastener then similarly locks the bearing to its seat.

DETAILED DESCRIPTION OF THE INVENTION

Figure 1:
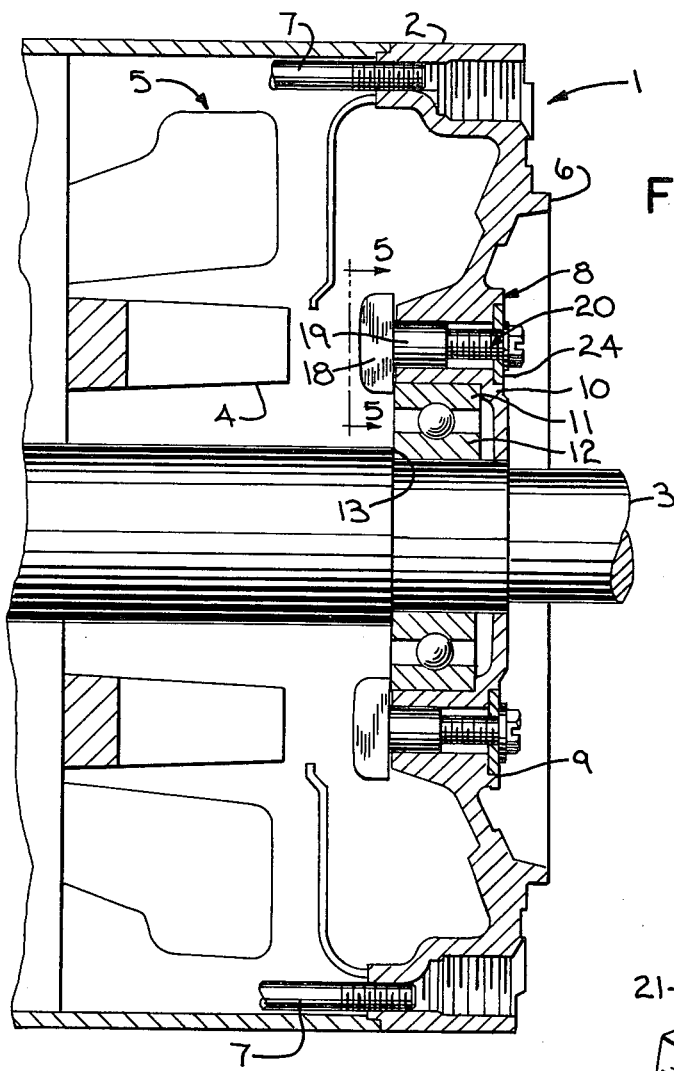
FIG. 1 is a cross section of the first embodiment of the invention assembled around the end of an electric motor and with a partially tightened bearing lock assembly and taken on line 1—1 of FIG. 3.

Referring to the drawings, there is shown one end of an electric motor 1 which has a frame 2 and a shaft 3 on which is mounted the rotor 4 which rotates within the stator 5.

A bearing locking bracket 6 is secured at one end of the electric motor 1 over the shaft 3 and held against frame 2 by a bolt 7 which extends through the motor and through a bearing locking bracket, not shown, at the opposite end of the motor and secured in place as by a locking bolt head, not shown.

Bearing locking bracket 6 extends inwardly from frame 2 and as illustrated, has a first abutment or housing 8 on one side of shaft 3 and a second abutment or housing 9 on the opposite side of shaft 3. A number of housings other than housings 8 and 9 may be provided in the locking bracket. Bearing seat 10 is provided in bracket 6 around shaft 3 and receives the bearing which has an outer race 11 and an inner race 12 within which are located the ball bearings. The shaft 3 may be notched at 13 in line with seat 10 to locate the bearing around shaft 3 and shaft 3 rotates within the inner race 12 of the bearing. The bearing and particularly the outer race 11 projects slightly outwardly of the bearing seat 10, as at 13a, and most clearly shown in FIG. 4.

Figure 2:
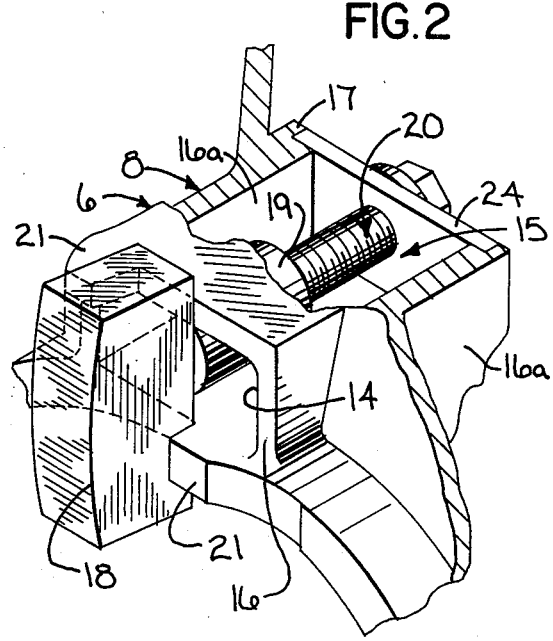
FIG. 2 is a detailed enlarged view of one of the housings of FIG. 1 illustrating the fastening member secured in place of the lock assembly.

It may be required that the bearing be locked in place in its seat and this may be accomplished under the invention after the motor 1 is completely assembled or as a preassembly to the bracket. The locking construction will be described in connection with the first housing 8, as particularly shown in detail in FIGS. 2 and 4 of the drawing. The locking construction of the second housing 9 normally would be the same as that of the first housing.

In the first embodiment of the locking mechanism, the housing 8 has openings 14 provided in alignment in the inboard wall 16 and outboard wall 17 of the housing 8. A central opening 15 extends between openings 14 and is bordered by the side walls 16a to form a continuous passage for receiving a fastening member. The slotted openings are of a size to permit passage therethrough of the generally large head 18 of an internally threaded fastening member 19. Head 18 is generally rectangular in shape and gives the fastener 19 a T-shaped appearance and the openings 14–15 are angularly offset from the T head locking position. In the illustrated embodiment, the openings are shown in a horizontal plane, but may be rotated about the shaft to any other location. In assembly of the fastener 19 it is first passed through the horizontally slotted opening 14 in the outboard wall 17 and thence through the central opening 15 and the corresponding slotted opening 14 in the inboard wall 16. Fastener 19 is then rotated by a screw 20, which threads into the fastener 19, a one quarter turn to angularly locate the head relative to the bearing outer race in a generally perpendicular position and abutting tabs or stops 21 which prevent any further rotation of the head once it is in locking position. The tabs 21 are located one each to opposite sides of the inboard slotted opening 14 and are located to lock the head 18 of the fastener 19 in position with one end over the outer race 11 of the bearing, as at 21a, and the opposite end over the outer wall 16 of the bracket opening as at 21b. Housing walls 16–17 locate head 18 radially with respect to the bearing to assure that the T-shaped head 18 will overlap the outer race 11 of the bearing.

Figure 4:
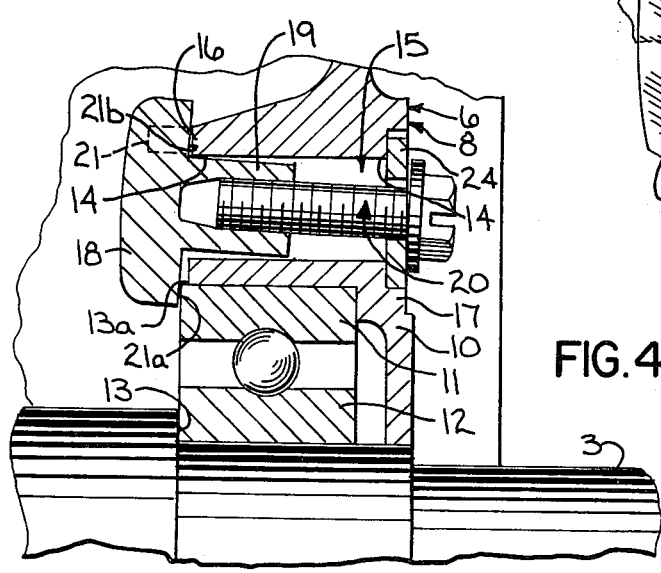
FIG. 4 is a detailed sectional view of the illustrated embodiment of the invention with the bearing lock assembly in the fully secured position.
Figure 3:
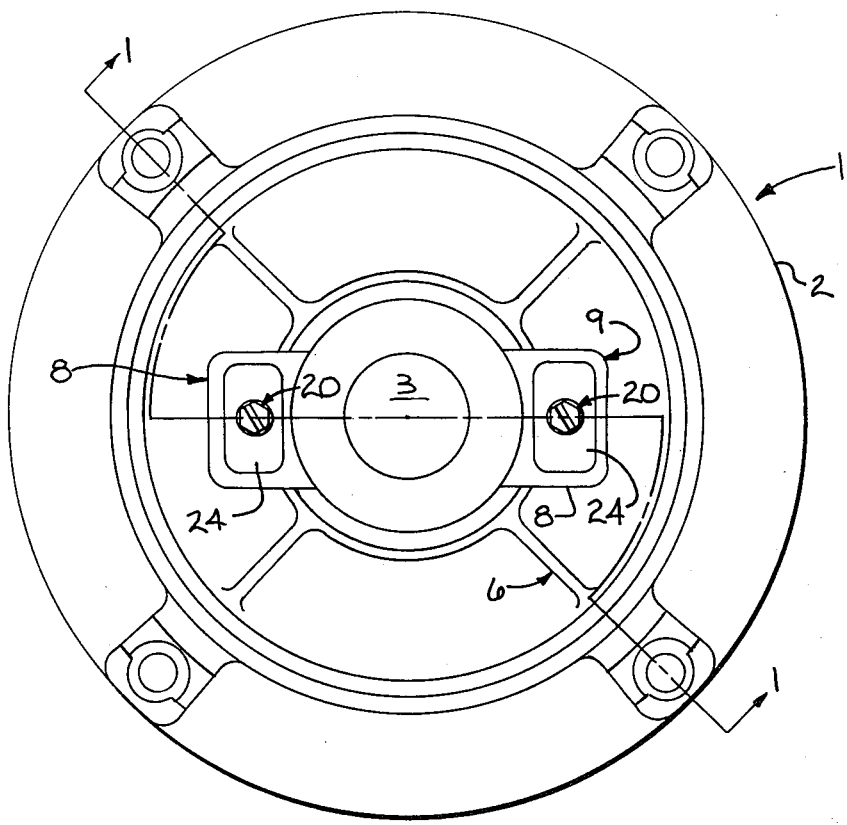
FIG. 3 is an end view of the fastening construction illustrating the two fastening members in place on opposite sides of the motor shaft.
Figure 5:
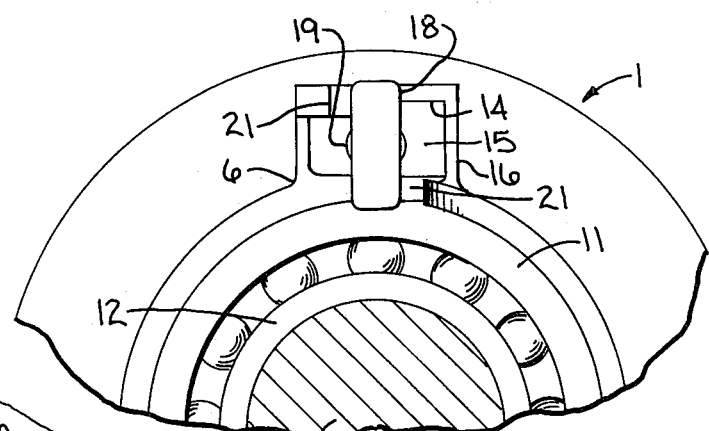
FIG. 5 is a view taken on line 5—5 of FIG. 1.

Under the first embodiment of the invention the screw 20 is threaded into fastener 19 through the slotted opening 15 in the outboard wall 17 of the housing 8. A washer 24 which may be generally of the shape of T head 18 is assembled over screw 20 before screw 20 is threaded into fastener 19. The washer 24 is seated in a recess in outboard wall 17 and maintains alignment of screw 20 relative to the head 18 to assure that the assembly is parallel with the axis of the bearing. The head of screw 20 engages washer 24 and locks it securely against the outboard wall 17. This secures T-shaped head 18 of fastener 19 against the outer race 11 of the bearing to lock the bearing into seat 10. As noted previously, the bearing projects outwardly of its seat and particularly defines a gap or space 13a between the innermost engaged face of bearing race 11 and the inboard wall 16, as shown in FIGS. 1 and 4. This assures that the bearing lock tightens against the bearing as the result of turning screw 20 and outward movement of fastener 19. T-shaped head 18 in locking position is located between the tabs 21 to assure that the head will rotate over wall 16 and then be locked in place between tabs 21 by the internal tightening of screw 20. Continued tightening of screw 20 will cause T head 18 to deflect to the position of FIG. 4 and thus be supported by the bearing race 11 at 21a one side and a clamp portion 21b of the inboard wall 16 on the other side, as shown most clearly in FIG. 4. This clamping action reduces stress on T head 18 from what it would be if the secondary support were not there and the construction tends to act like a lock washer, should the fastener be subject to vibrations or the like. The location of the head 18 between the tabs 21 prevents rotation of head 18. The bearing locking assembly holds the bearing in place by means of an axial preload on outer race 11 against bearing seat 10. The preload is the axial force generated by and proportional to the torque applied to screw 20.

Figure 6:
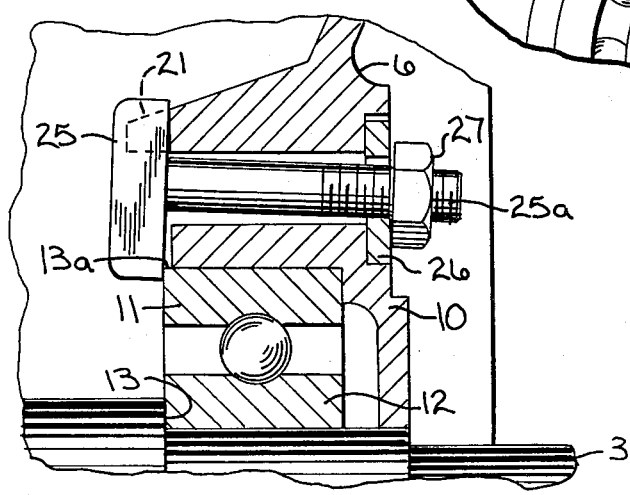
FIG. 6 is a detail view of a portion of a second embodiment of the invention.

In the second embodiment of the invention illustrated in FIG. 6, the locking fastener 19 has an enlarged T-shaped head 25 at the inner end and an outwardly extending shank which has threads 25a at the outer end. The housing 8 in which the fastener 19 is lodged may be as in the first embodiment and with openings 14–15 and bordered at opposite ends by inboard wall 16 and outboard wall 17. The respective walls 16 and 17 have the aligned slotted openings 14 and tabs 21 are located on both sides of the opening 14 in inboard wall 16 to prevent rotation of the fastener when it is located in place, the same as in the first embodiment. A washer 26 is assembled over threads 25 and a nut 27 is then threaded onto the threads 25a of the fastener 19, thereby locking fastener member 25 against the inboard wall 16 and washer 26 located in a recess in the outboard wall 17 of housing 8. Nut 27 is threaded onto the fastener 19 to initially rotate it a quarter of a turn to locate the head 25 thereof in overlapping relation with respect to the outer race 11 of the bearing and also secure the head 25 between the two stops 21 to prevent further rotation of fastener 19. The bearing race 11 again projects beyond the inboard wall 16. Further, tightening of the nut on the thread shank 25a moves the head 25 into a deflected bearing holding position as in the first embodiment.

The invention has few parts and the locking assembly is easily assembled in place and one of the main features is that the bearing locking assembly can be constructed after the motor has been completely assembled and it appears desirable that the bearing be locked in place around the motor shaft 3. The means of the locating the lock relative to the bearing and the means in which the bearing preload is applied and supported distinguish the bearing locking assembly over the prior art.

Various modes of carrying out the invention are contemplated as being within the scope of the following claims particularly pointing out and distinctly claiming the subject matter which is regarded as the invention.

I claim:

1. A bearing locking assembly for a dynamoelectric machine having a frame and shaft, comprising a bearing bracket assembled over an end portion of the shaft of the dynamoelectric machine and secured to the frame of the dynamoelectric machine, a bearing seat provided in the bracket around the shaft of the dynamoelectric machine, a bearing disposed around the shaft in said seat, said bearing including an outer peripheral member located outwardly of the bearing seat, at least one abutment provided in the bracket on one side of the bearing and shaft, a generally central opening located in the abutment and an inboard wall disposed at the inner end of the central opening, said inboard wall having a slotted opening, said slotted opening being noncircular and having a width extending across the bearing seat and having a radial depth less than said width, and bearing fastening means extending through the slotted opening and the central opening and having a support means and a symmetrical head of a length greater than said radial depth and less than said width and movable through said slotted opening and rotatable about the support means to a position crossways of said slot and preventing movement through the opening and said head having a first portion to one side of said support means disposed to overlap a portion of the peripheral member of the bearing so that when the fastening means is secured within the abutment the bearing is held securely within its seat around the motor shaft.

2. The bearing lock assembly of claim 1 wherein the abutment includes a clamp portion outwardly of said slot and said peripheral member, the head of the fastening means includes a second portion to the opposite side of the support means from said first portion aligned with said clamp portion, and said head is deflected when secured to the abutment with said second portion abutting said clamp portion.

3. The bearing locking assembly of claim 1 and the bearing fastening means comprising a bearing lock with threads on the inside and extending through the opening in the outboard wall and through the opening in the inboard wall, said head being affixed to said bearing lock, and stops provided on opposite sides of the slotted opening in said inboard wall, said head being lodged between the stops and of a size to overlap the bearing, and a screw extending through the opening in the outboard wall and threaded into the bearing lock to define said support means and a washer assembled over the screw beneath the head of the screw and pressed against the outboard wall by the head of the screw when the screw is threaded home to secure the bearing lock in place.

4. The bearing locking assembly of claim 1 and the bearing fastening means comprising a bearing lock in the form of a bolt having said head on one end and threads on the outer end portion and extending through the opening in the inboard wall and through the outboard wall, stops provided on opposite sides of the opening in the inboard wall and said head of said bearing fastening means being a generally large head lodged between the stops to prevent rotation of the bearing lock and of a size to overlap the bearing, and a washer assembled over the outer end of the bearing lock and a nut threaded onto the bearing lock and against the washer to secure the bearing lock to the outboard wall of the bearing bracket and lock the bearing in its seat.

5. The bearing locking assembly of claim 1 and a second abutment provided in the bracket on the opposite side of the bearing, said second abutment having a bearing fastening means constructed in the same manner as the fastening means of claim 1.

6. The bearing locking assembly of claim 1 wherein said bearing seat includes an annular outer encircling wall, said bearing includes an outer race seated within said seat and projecting axially inwardly of the encircling wall within said bracket to form said peripherial member, said inboard wall of said abutment being a flat wall member located in plane perpendicular to the axis of said bearing and axially outwardly of said outer race, said fastening means including a T-shaped member including a stem portion located within said slotted opening and said head secured to said stem and located inwardly of the abutment and a second securement member threadedly attached to said T-shaped member and forcing said T-shaped member to move outwardly with one end of said head disposed in abutting clamping engagement with the inner face of said outer race and with said head deflected to locate the opposite end of said head in abutting engagement with said abutment.

7. The bearing locking assembly of claim 1 including at least one additional abutment circumferentially spaced from said first abutment, and bearing fastening means constructed in the same manner as the fastening means of claim 1 in each additional abutment.

8. A bearing locking assembly for a dynamoelectric machine having a frame and shaft, comprising a bearing bracket assembled over an end portion of the shaft of the dynamoelectric machine and secured to the frame of the dynamoelectric machine, a bearing seat provided in the bracket around the shaft of the dynamoelectric machine, a bearing disposed around the shaft in said seat, at least one abutment provided in the brakcet on one side of the bearing and shaft, a generally central opening located in the abutment and inboard and outboard walls disposed on opposite ends of the central opening and having aligned slotted openings in both the inboard and outboard walls, said slotted openings extending across the bearing seat, a bearing fastening means extending through the slotted openings and the central opening and having a head generally corresponding in shape and size to said slotted openings for movement through said openings, said head being supported by a fastener element located generally centrally of the head and operable to rotate the head and thereby dispose the head overlapping a portion of the bearing, said abutment having a wall member aligned with the head in the rotated position of the head, and means to secure the fastening element to the abutment with the opposite sides of the head engaging the bearing and the wall member and securely holding the bearing within its seat around the motor shaft.

9. The bearing locking assembly of claim 1 and the bearing fastening means comprising a first member including said head and a second outer member threadedly coupled to said first member, said second member defining a second outer head, stops provided on opposite sides of the inboard wall and located to permit one-way rotation of the inserted head to lodge said head between the stops and overlapping the bearing, and a washer assembled over the members and beneath the outer head and pressed against the outboard wall by the outer head when the first and second members are threaded home to secure the bearing fastening means in place.

10. The bearing locking assembly of claim 8 and the bearing fastening means comprising a bearing lock in the form of a bolt having said head on the inner end portion and threads on the outer end portion and extending through the openings in the inboard wall and through the outboard wall, stops provided on opposite sides of the opening in the inboard wall, said bearing fastening means having said head lodged between the stops to prevent rotation of the lock and of a size to overlap the bearing, and a washer assembled over the outer end of the bearing lock and a nut threaded onto the bearing lock and against the washer to secure the bearing lock to the outboard wall of the bearing bracket and lock the bearing in its seat.

11. The bearing locking assembly of claim 8 and a second abutment provided in the bracket on the opposite side of the bearing, said second abutment having a bearing fastening means constructed in the same manner as the fastening means of claim 8.

* * * * *